United States Patent
Jouard et al.

(10) Patent No.: US 10,670,883 B2
(45) Date of Patent: Jun. 2, 2020

(54) ELECTRONIC SPECTACLE FRAME

(71) Applicant: Essilor International, Charenton-le-Pont (FR)

(72) Inventors: Ludovic Jouard, Charenton-le-Pont (FR); Eric Patin, Ugine (FR)

(73) Assignee: Essilor International, Charenton-le-Pont (FR)

( * ) Notice: Subject to any disclaimer, the term of this patent is extended or adjusted under 35 U.S.C. 154(b) by 164 days.

(21) Appl. No.: 15/762,772

(22) PCT Filed: Sep. 8, 2016

(86) PCT No.: PCT/FR2016/052249
§ 371 (c)(1),
(2) Date: Mar. 23, 2018

(87) PCT Pub. No.: WO2017/051094
PCT Pub. Date: Mar. 30, 2017

(65) Prior Publication Data
US 2019/0113769 A1   Apr. 18, 2019

(30) Foreign Application Priority Data
Sep. 24, 2015   (EP) .................................. 15306486

(51) Int. Cl.
| G02C 1/00 | (2006.01) |
| G02C 1/08 | (2006.01) |
| G02C 7/08 | (2006.01) |
| G02C 11/00 | (2006.01) |
| G02C 5/02 | (2006.01) |
| G02B 27/01 | (2006.01) |

(52) U.S. Cl.
CPC ............... *G02C 1/08* (2013.01); *G02C 7/083* (2013.01); *G02C 11/10* (2013.01); *G02B 27/017* (2013.01); *G02B 2027/0178* (2013.01); *G02C 5/02* (2013.01)

(58) Field of Classification Search
CPC ... G02C 11/10; G02C 7/083; G02F 1/133526; G02F 1/133528; G02F 1/1393; G02F 1/13318
USPC ................................ 351/158, 41, 44; 349/13
See application file for complete search history.

(56) References Cited

U.S. PATENT DOCUMENTS

| 6,097,450 A * | 8/2000 | Humphrey ............. G02B 26/04 349/13 |
| 2008/0013041 A1 | 1/2008 | Chou |
| 2012/0127420 A1 | 5/2012 | Blum et al. |
| 2013/0070198 A1 | 3/2013 | Willey et al. |

(Continued)

FOREIGN PATENT DOCUMENTS

| WO | 2013/025933 A1 | 2/2013 |
| WO | 2013/188805 A2 | 12/2013 |

OTHER PUBLICATIONS

International Search Report dated Nov. 24, 2016, in PCT/FR2016/052249, filed Sep. 8, 2016.

*Primary Examiner* — Hung X Dang
(74) *Attorney, Agent, or Firm* — Oblon, McClelland, Maier & Neustadt, L.L.P.

(57) ABSTRACT

An electronic spectacle frame including: a face element including a housing for at least partially receiving a lens; and at least one electronic component. The face element includes at least one recess for receiving the at least one electronic component.

13 Claims, 3 Drawing Sheets

(56) References Cited

U.S. PATENT DOCUMENTS

2014/0028966 A1 1/2014 Blum et al.
2014/0204331 A1 7/2014 Huh
2015/0248026 A1 9/2015 Willey et al.

* cited by examiner

ELECTRONIC SPECTACLE FRAME

The invention relates to an electronic frame.

It may be a question, by way of nonlimiting example, of an electronic frame including electronic components, in order to obtain an optical device, for example a pair of spectacles equipped with correcting eyeglasses, for example with correcting lenses or eyeglasses such as variable-amplitude ophthalmic cells the amplitude of which is controlled via an electronic circuit, or indeed even with simple eyeglasses, whether tinted or not.

An electronic frame for an optical device usually includes:

a front element comprising an accommodating housing for at least one lens;

and at least one electronic component.

To produce a front element of an electronic frame requires the presence of electrical connections, connecting sensors, active electronic components and connecting elements located at various locations on the front.

The term "front" will be understood to mean a set of elements of an electronic frame for an optical device that are intended to be placed in front of a face when the electronic frame is worn by a user.

It is sometimes complicated to place electronic components or electric connections in the front of an optical electronic frame.

The invention aims to provide an electronic frame that is easy to produce, and that allows components and connections to be mounted with ease and accessed, even after said lens has been installed.

Moreover, the invention aims to provide an attractive electronic frame in which the electronic components and the connections are protected.

To this end, the invention provides an electronic frame of the aforementioned type, i.e. including a front element comprising an accommodating housing, able to at least partially house a lens, said electronic frame including at least one electronic component. The electronic frame according to the invention is noteworthy in that said front element includes at least one recess for accommodating said at least one electronic component.

The term "recess" will be understood to mean an open cavity, forming an indent in the front element.

The front element thus produced allows electronic components to be put in place with ease, since it is enough to insert the component into a recess, before or after the at least one lens has been put in place, upstream of any of the other assembly operations required to complete the electronic frame.

As the recess is an open cavity, the electronic component remains accessible even after it has been positioned in the recess.

The electronic frame according to the invention may also include the following features, separately or in combination:

the accommodating housing is preferably distinct from said at least one recess. The term "distinct" will be understood to mean the fact of being "separate from", of existing as such, of not including common portions;

said at least one recess may have a cross section the shape of which is at least partially complementary to the shape of said at least one electronic component. This embodiment allows the component to be inserted to be recognized and it to be held in place;

said recess may include at least one protruding portion for retaining said at least one component. The protruding retaining portion allows the component to be held in place, thereby allowing the assembly of the electronic frame to be facilitated;

said at least one recess may have an identifier allowing said at least one component to accommodate to be identified. This embodiment also facilitates assembly;

said at least one recess may include a bottom having a convex surface. The convex surface facilitates insertion of the electronic component into the recess;

said recess may be shaped in order to allow access to an electronic component associated with said at least one lens, once said at least one lens has been at least partially inserted into said housing and said electronic component associated with the lens has been inserted into said recess;

said at least one electronic component may be an electronic component chosen from the group comprising: an active component, a passive component, a cable, a flexible circuit, a photosensitive sensor or a light-emitting diode;

said front element may be a holder designed to accommodate an upper portion of at least one lens;

the electronic frame may include a cradle, having a secondary accommodating housing, able to at least partially house a lower portion of said at least one lens, said cradle and said holder being able together to encircle said at least one lens;

said front element may, according to another embodiment, be a cradle, able to at least partially house a lower portion of said at least one lens;

said front element may be made from a flexible material and may define at least one housing able to encircle a lens;

the electronic frame may include at least one electronic component, housed in said at least one recess, and a beam at least partially fastened to said front element, said beam masking said at least one recess in which said at least one electronic component is accommodated. In this way, the electronic components are protected from the environment;

lastly, the electronic frame may include two temples each connected to one end of said front element, by a hinge.

The invention also relates to an optical device including an electronic frame such as defined above and at least one active lens.

In order to allow it to be implemented, the invention is described in a manner sufficiently clear and complete in the following description that, in addition, is accompanied by drawings in which.

For the sake of clarity, only the elements useful for understanding the embodiments described have been shown.

Figure 1:
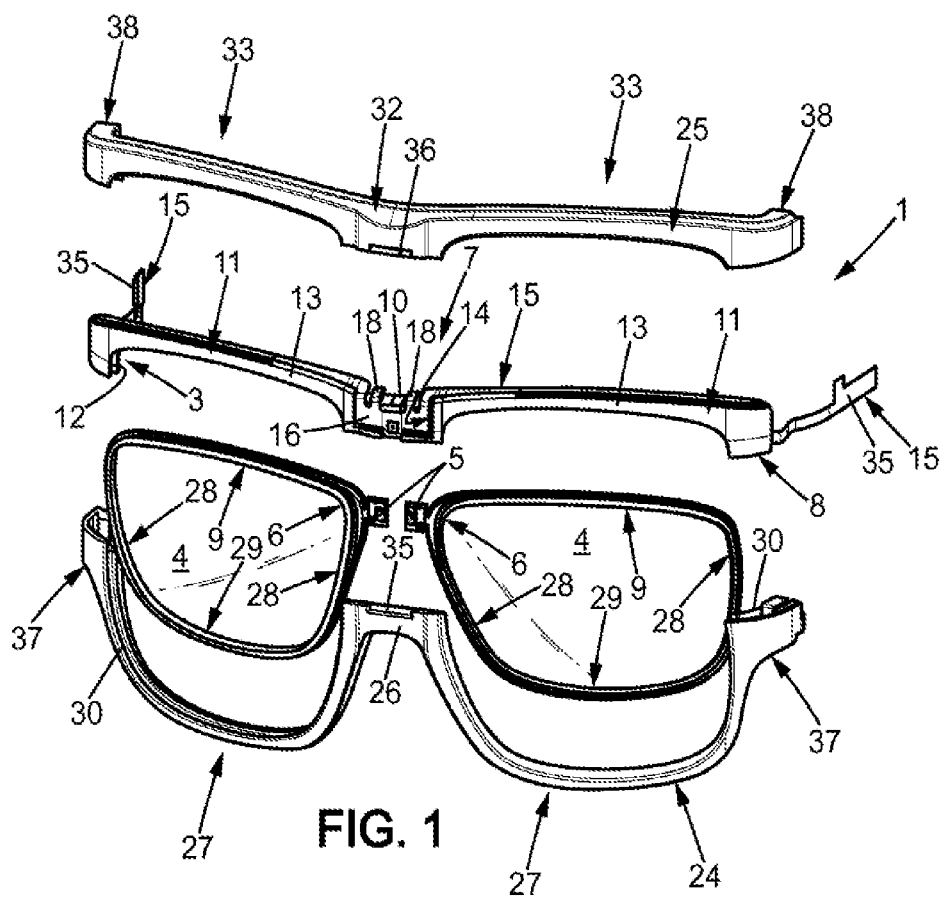
FIG. 1 is an exploded perspective view of an electronic frame equipped with lenses, according to a first embodiment according to the invention.

FIG. 1 shows several elements that together form an electronic frame according to the invention, and more particularly a front of an electronic frame, i.e. the portion of the electronic frame that is placed in front of the face of a wearer of the electronic frame. The elements have been illustrated disassociated from one another.

The electronic frame 1 includes a front element 2 that includes an accommodating housing 3 able to partially house a lens 4.

In the example illustrated in the figures, the electronic frame 1 is designed to receive two lenses 4 but it will be understood that the invention is not limited to an electronic frame designed to receive two lenses. Specifically, the electronic frame according to the invention could be designed to receive only one goggles- or mask-type lens, without departing from the context of the invention, the goggles- or mask-type lens being sufficiently large to reach in front of both eyes of a wearer when the electronic frame is being worn.

In addition, in the context of this example, the two lenses 4 are active lenses. By active lens what is meant is a lens that is associated with an electronic component allowing its state to be changed when the electronic component is activated.

For example, the active lenses 4 may be variable-amplitude ophthalmic cells the amplitude of which is controlled by an electronic circuit 5, or phase-modulation lenses or smart lenses, etc.

It should be understood that the invention is not limited to an optical device including an electronic frame equipped with active lenses. Specifically, a device including an electronic frame according to the invention may be equipped with passive lenses, i.e. lenses that may (or may not) have optical properties but that are not designed to change state (under the control of an electronic component, for example).

Figure 5:
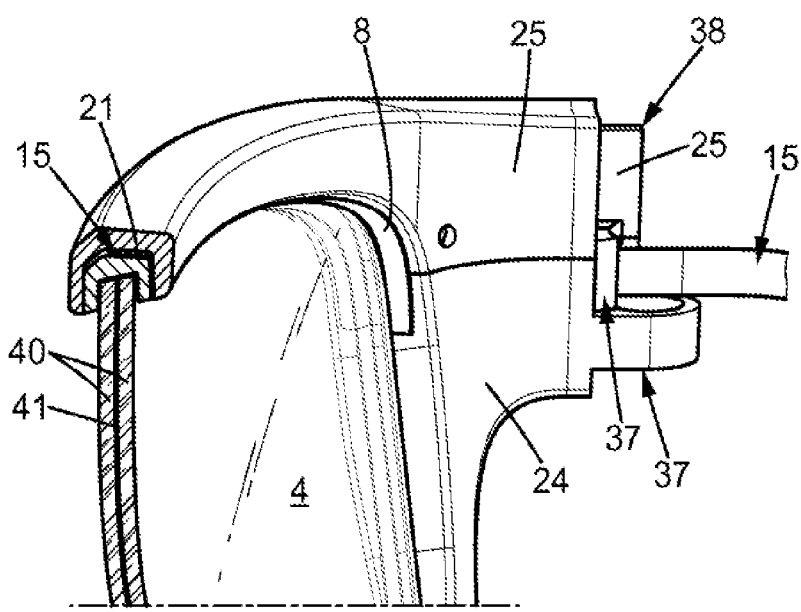
FIG. 5 is a partial cross-sectional view of an electronic frame according to the invention with all the elements illustrated in FIG. 1 assembled together.

FIG. 5 shows in cross section a variable-amplitude ophthalmic-cell-type lens, the lens 4 comprising two parallel walls 40, made from a first material, between which is imprisoned a layer 41 made from a second material.

Each of the lenses 4 is of ovoid shape and is connected to its control circuit 5 positioned on a portion 6 of the lens, the portion 6 being intended to be positioned facing the nose of a wearer of the electronic frame 1.

The zone of the electronic frame 1 designed to be positioned level with the nose of a wearer will be called the nasal zone 7 of the electronic frame.

To be qualified electronic, the electronic frame 1 may include one or more electronic components, independently of the two electronic circuits 5 of the lenses 4.

In the described example, the front element 2 including at least one electronic component is a holder 8 designed to at least partially accommodate an upper portion 9 of the lenses 4.

The holder 8 is a longitudinal part, having a front face 81 oriented to the fore of the electronic frame and a back face 82 oriented to the rear of the electronic frame. The back face 82 of the holder 8 will be located facing the face of the wearer when the wearer wears the electronic frame 1.

The holder 8 has a central portion 10 located level with the nasal zone 7 of the electronic frame 1.

On either side of the central portion 10, the holder 8 has two portions 11 that are symmetric with respect to the central portion 10.

Each symmetric portion 11 is formed by a circularly arcuate profile 13 that includes a groove 12 designed to accommodate the upper portion 9 of a lens 4. The curvature of the circularly arcuate shape 13 substantially corresponds to the shape of the upper portion 9 of the lens.

According to the invention, the holder 8 (corresponding to the front element 2) includes at least one recess 14 in order to accommodate at least one electronic component of the electronic frame 1.

More exactly, in the context of this example embodiment, the holder 8 includes a plurality of recesses 14, each recess 14 allowing at least one electronic component to be accommodated.

Figure 2:
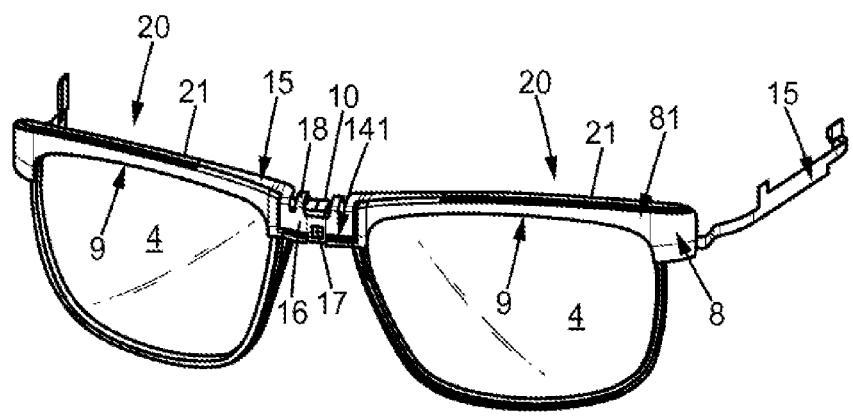
FIG. 2 is a perspective view of a portion of the electronic frame equipped with lenses which is illustrated in FIG. 1, FIG. 2 showing the front of the electronic frame from in front.
Figure 3:
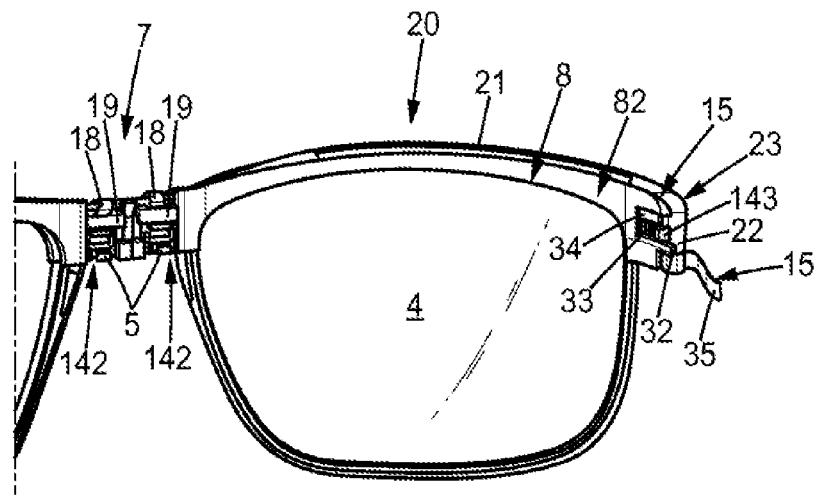
FIG. 3 is another perspective view of the electronic frame illustrated in FIG. 2, showing the front of the electronic frame from behind.

Reference will now be made to FIGS. 2 and 3 to describe the recesses 14 and the electronic components.

The electronic components may be of different natures: it may be a question of an active component or of a passive component.

The expression "active component" will be understood to mean an electronic component allowing a response to be generated or processed following reception of a signal originating from other active components.

The expression "passive component" will be understood to mean an electronic component allowing signals to be transmitted, but that is not able to generate or process them. For example, a flexible circuit including only a conductive strip, or indeed even a cable, is a passive component. An active circuit is for example a photosensitive sensor or a light-emitting diode.

The electronic frame according to the invention may include any one of the components listed below.

One type of electronic component is a conductive strip 15, commonly called a "flex", that is made up of a flexible carrier on which a conductive track has been printed. In other words, the conductive strip 15 is a flexible circuit.

The conductive strip 15 is designed to connect the electronic circuits 5 or other electronic components, for example another control circuit, a light-emitting diode, a battery for supplying electrical power, a light sensor, etc.

The conductive strip 15 includes a central strip portion 16 of substantially rectangular shape, designed to be positioned level with the nasal zone 7 of the electronic frame 1, on the front face of the electronic frame 1.

To do this the holder 8 has, in its central portion 10 and in its front face 81, a first recess 141 designed to accommodate the central strip portion 16.

The recess 141 has a shape complementary to that of the central strip portion 16 so that, when the central strip portion 16 is inserted into the recess 141, it is wedged in position.

The fact of providing a recess 14 of shape complementary to that of an electronic component allows the component to be placed to be correctly oriented, and it to be maintained in place once inserted. This allows the electronic component to be held in place, thereby facilitating assembly of the electronic frame and/or of the optical device including such an electronic frame.

The complementary shape of the recess 14 also allows the component to be placed to be identified (by comparing the shapes of the recess and of the component).

It should be understood that the invention could include other identifying means, such as for example an inscription or a symbol engraved into the bottom of the recess 14.

The recess 141 has a bottom having a convex surface, in order to facilitate the positioning of the conductive strip 15.

A light sensor 17 is located substantially at the center of the central strip portion 16.

The light sensor 17 must be connected to the electronic circuits 5 of the active lenses 4. Thus, the conductive strip 15 includes two tabs 18 passing over the top of the central portion 10 of the holder 8, the tabs 18 having ends that lodge in recesses 142 produced in the back face 82 of the holder 8 in the central portion 10 of the holder.

The recesses 142 at least partially have the shape of the electronic circuits 5 of the lenses, so as to be able to accommodate them. Specifically, the electronic circuits 5 of the lenses are fastened to the ends of the tabs 18 of the conductive strip 15, so as to be connected to the light sensor 17, allowing the electronic circuits 5 of the lenses 4 to be activated or deactivated.

Thus, each of the recesses 142 accommodates one end of a tab 18 of the conductive strip 15, on which end an electronic circuit 15 is positioned.

As each of the recesses 142 has a shape that is partially complementary to the shape of the electronic circuit 5, the latter is held in place during the assembly of the optical device including an electronic frame according to the invention and active lenses 4.

The tabs 8 and their ends are held in place on the back face of the central portion 10 of the holder 8, in the housings 142, by virtue of small positioning bars 19.

Specifically, each recess 142 includes a small protruding bar 19 that connects two edges of the recess 142 and that forms a bridge under which the tab 18 of the conductive strip 15 may pass.

It will be noted that the recess 142 is thus configured to receive the electronic circuit 5 associated with an active lens 4 when the lens 4 is partially inserted into the accommodating groove 12 of the holder 8. The configuration of the recess 142 allows the electronic circuit 5 to be accessed.

This is also possible by virtue of the fact that the recess 142 is distinct from the groove 12 accommodating the lens 4.

The term "distinct" will be understood to mean the fact that the recess 142 and the groove 12 are two different hollows, that have no common portion.

The conductive strip 15 has two portions 20 that are symmetric with respect to the central portion 16, which lie on either side of the central portion 16 belonging to the elements of the nasal zone 7 of the electronic frame.

Each symmetric portion 20 of the conductive strip 15 includes a band 21 that extends over a length substantially equal to the length of a symmetric portion 11 of the holder 8, so that this band 21 may be fastened by adhesive bonding to the entire length of the edge face of the symmetric portion 11 of the holder 8.

The band 21 has, at its end, a first dog-legged band portion 22 (FIG. 3) that is fastened to the holder end 23.

The end 23 of the holder 28 is designed to be connected to a temple by means of a hinge. The other end 24 of the holder is also designed to be connected to a temple by means of a hinge. The temples are not illustrated in the figures, in order to make it easier to read the figures.

In this way, the electronic frame 1 may be equipped with temples, in order to allow a wearer to wear the device including such an electronic frame 1 equipped with lenses 4 by positioning the temples of the electronic frame 1 above his ears.

The first dog-legged band portion includes a tab 32 able to be inserted into a third recess 143, the latter being produced in the back face 82 of the holder 8 substantially at the end 22 of the holder 8.

The third recess 143 is intended to house a light-emitting diode 33, positioned on the tab 32 of the conductive strip 15.

The tab 32 is held in place in the recess 143 by a protruding portion 34 of an edge of the recess 143, the protruding portion being directed toward the interior of the recess 143.

The first dog-legged band portion 22 is extended by a second band portion 35, forming a dog leg with the first band portion 22, so as to extend the conductive strip 15 each side of the holder 8 in a curve substantially parallel to the curve along which the band 21 extends.

The second band portions 35 are designed to be accommodated in the temples of the electronic frame and their objective is to connect electronic components located in the temples to the electronic components borne by the holder 8.

In the present example embodiment, the electronic frame 1 also includes a cradle 24 and a beam 25 (FIG. 1), respectively allowing the lateral portions 28 and lower portions 29 of the lenses 4 to be encircled and the holder 8 including the electronic components to be covered and thus protected.

The cradle 24 and the beam 25 are designed to fasten together, to enclose the holder 8 bearing the electronic components (conductive strip 15, sensor 17, electronic circuits 5 of the lenses 4), and to encircle the lenses 4 so as to hold them in place.

The cradle 24 is shown in FIG. 1. It includes a central cradle portion 26 designed to belong to the elements of the nasal zone 7 of the electronic frame 1.

On either side of the central portion 26 of the cradle 24, the latter includes two cradle portions 27 that are symmetric with respect to the central portion 26, each of the symmetric cradle portions 27 having a shape complementary to that of the lateral portions 28 and lower portions 29 of the lenses 4.

Each of the symmetric portions 27 includes an internal groove 30 into which are inserted the lateral portions 28 and lower portions 29 of the lenses 4 (FIG. 1).

Figure 4:
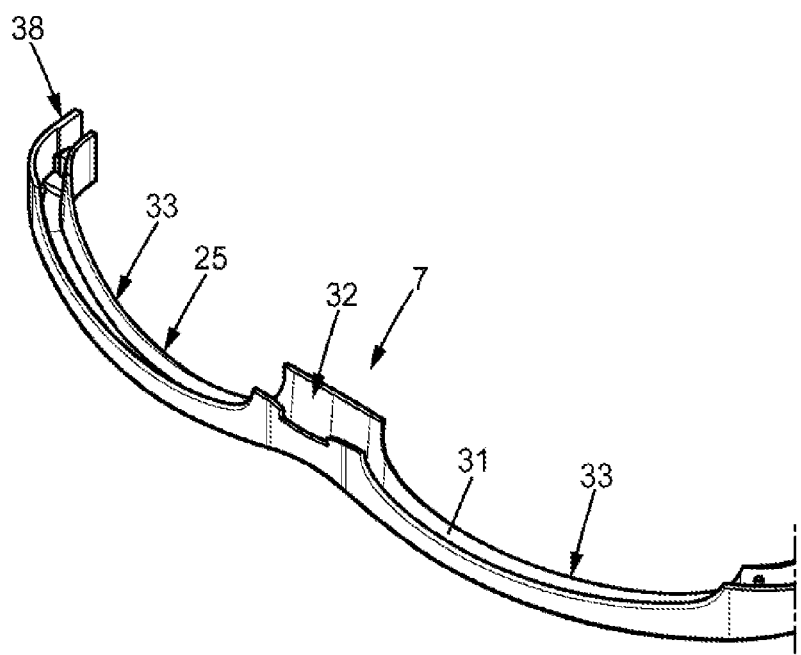
FIG. 4 is a perspective view of a beam with which the electronic frame shown in FIG. 1 is able to be equipped, the beam being shown in a flipped position with respect to its position illustrated in FIG. 1.

The beam 25 has a shape that is substantially identical to that of the holder 8, and has a U-shaped cross section forming a housing 31 in order to accommodate the holder 8 and all the electronic components that it bears (see FIGS. 4 and 5).

The beam 25 thus has a central beam portion 32, which belongs to the elements of the nasal zone 7 of the electronic frame, and two portions 33 that are symmetric with respect to the central portion 32 of the beam 25, which lie on either side of the central portion 32.

The central beam portion 32 is designed to be assembled with the central cradle portion 26.

Each of the central beam portion 32 and central cradle portion 26 includes a notch, 35 and 36, respectively, the two notches 35 and 36 facing each other when the cradle 24 is assembled with the beam 25.

In this way, when the cradle 24 and the beam 25 are assembled and form a casing around the lenses 4 and the holder 8, the two notches 35 and 36 form a transparent aperture allowing light rays to pass through the casing level with the nasal zone 7 of the electronic frame 1, so that the light rays can reach the light sensor 17.

The cradle 24 and the beam 25 lastly include ends 37 and 38, respectively, which are configured to be assembled with the temple ends and to receive a hinge.

It will be understood from the above description how, by virtue of the invention, it is easy to create a complete optical device, allowing electronic components to be easily put and held in place in a front element of the electronic frame (a holder 8 in the example illustrated in the figures) before or after the lenses have been mounted in the optical device. Connection of active lenses to the rest of the electronics borne by the holder is particularly easy.

In addition to allowing electronic components to be positioned in the front of an electronic frame, the invention allows them to be masked.

The invention also allows the electronic frame to preserve an attractive appearance, similar to that of a conventional electronic frame.

The holder 8, in the embodiment presented above, not only holds the upper portion of the lens 4, but in addition it holds and positions the electronic components, which remain accessible because the recesses that house the electronic components are distinct from the housing accommodating the upper portion of the lens 4. In particular, the holder allows the passage of at least one cable, conductive strip, or wire connecting the holder 8 to at least one temple, or connecting the holder 8 to an active lens 4.

Electronic components may be mounted in the holder 8 upstream of any other assembly operations required to complete a device including such an electronic frame.

The holder 8 may be a component produced with molded interconnect device (MID) technologies. These technologies in particular allow conductive tracks to be produced directly on a part made of plastic (the holder in the present case). These technologies may thus allow a flexible cable or a wire to be replaced, for example.

A frame according to the invention may thus include electronic components in each temple and a holder produced using MID technologies, allowing the components of the two temples to be interconnected.

The beam 25 allows the electronic frame in its entirety to be closed and plays an esthetic and environmental-protection role.

In the context of this embodiment, the cradle 24 and the holder 8 are two distinct portions that permit the use of different materials to make them: the cradle, as it is external and visible, is subject to high esthetic constraints. The holder 8, as it is not external and not visible, may be made from a more technical material (rigidity, shock-damping, capacity to spread the heat of a light-emitting diode).

It should however be understood that the invention could be implemented in a different way to that illustrated in the figures, without however departing from the scope of the invention.

For example, the front element including at least one electronic component could be a cradle (instead of a holder) able to house a lower portion of a lens. In the context of this embodiment, provision could also be made for the electronic frame to include a holder devoid of electronic components, at least partially encircling the lenses.

In one variant embodiment, provision could be made for a cradle including at least one electronic component and no holder. The lenses of the ophthalmic device would then be retained by a wire.

In another variant embodiment, the front element could also combine a holder and cradle of sufficient flexibility to allow the lenses to be inserted.

The invention claimed is:

1. An electronic frame comprising:
  a front element including an accommodating housing, configured to at least partially house a lens; and
  at least one electronic component;
  wherein the front element includes at least one recess to accommodate the at least one electronic component,
  wherein the accommodating housing is distinct from the at least one recess, and
  wherein at least another recess includes at least one protruding portion protruding from an edge of the at least another recess to retain the at least one electronic component.

2. The electronic frame as claimed in claim 1, wherein the at least one recess has a cross section of a shape at least partially complementary to a shape of the at least one electronic component.

3. The electronic frame as claimed in claim 1, wherein the at least one recess includes an identifier allowing the at least one electronic component to be identified.

4. The electronic frame as claimed in claim 1, wherein the at least one recess includes a bottom having a convex surface.

5. The electronic frame as claimed in claim 1, wherein the at least one recess is shaped to allow access to an electronic component associated with the lens, once the lens has been at least partially inserted into the accommodating housing and the electronic component associated with the lens has been inserted into the recess.

6. The electronic frame as claimed in claim 1, wherein the at least one electronic component is an electronic component chosen from the group: an active component, a passive component, a cable, a flexible circuit, a photosensitive sensor, or a light-emitting diode.

7. The electronic frame as claimed in claim 1, wherein the front element is a holder configured to accommodate an upper portion of the lens.

8. The electronic frame as claimed in claim 7, further comprising a cradle, including a secondary accommodating housing, configured to at least partially house a lower portion of the lens, the cradle and the holder being configured to encircle the lens.

9. The electronic frame as claimed in claim 1, wherein the front element is a cradle configured to at least partially house a lower portion of the lens.

10. The electronic frame as claimed in claim 1, wherein the front element is made from a flexible material and defines at least one housing configured to encircle a lens.

11. The electronic frame as claimed in claim 1, wherein the at least one electronic component is housed in the at least one recess, and further comprising a beam at least partially fastened to the front element, the beam masking the at least one recess in which the at least one electronic component is accommodated.

12. The electronic frame as claimed in claim 1, further comprising two temples each connected to one end of the front element by a hinge.

13. An optical device comprising the electronic frame as claimed in claim 12 and at least one active lens.

* * * * *